March 18, 1941.    F. W. HAVERSACK    2,235,553
PIPE-FORMING MACHINE
Filed Nov. 8, 1937    2 Sheets-Sheet 1
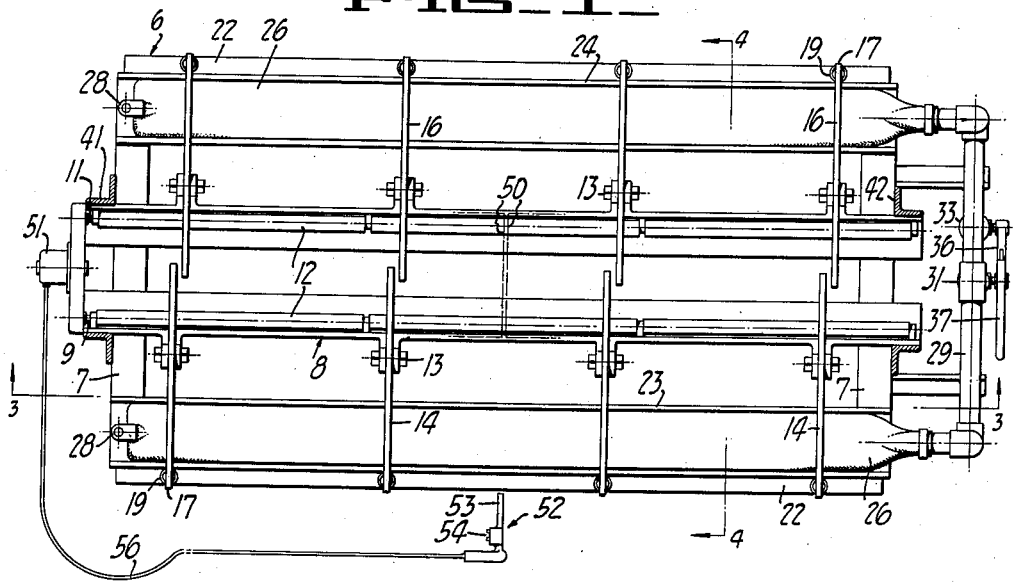
FIG_1_
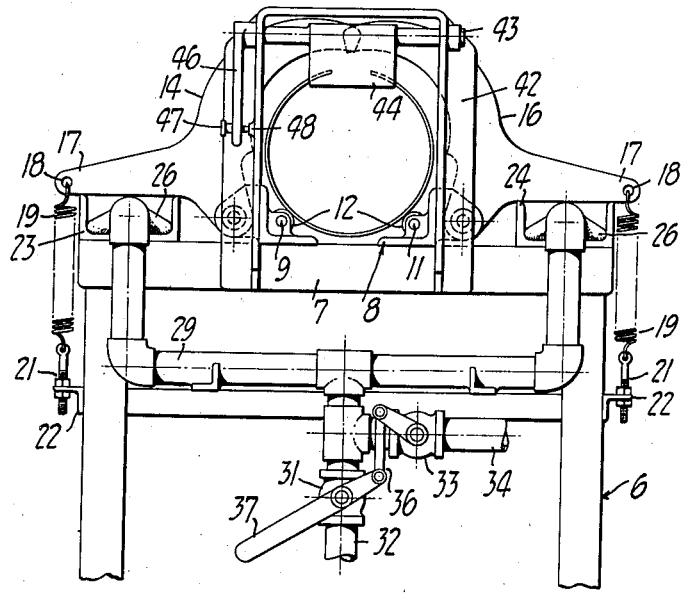
FIG_2_
INVENTOR.
Frederick W. Haversack
BY Marcus Lothrop
ATTORNEY.

March 18, 1941.　　F. W. HAVERSACK　　2,235,553
PIPE-FORMING MACHINE
Filed Nov. 8, 1937　　2 Sheets-Sheet 2
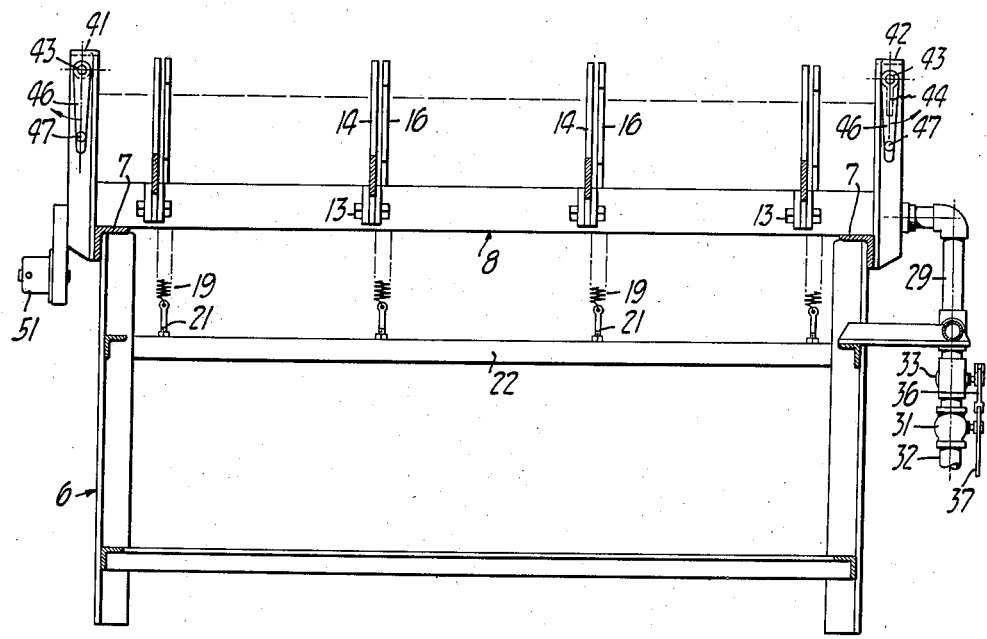
FIG_3_
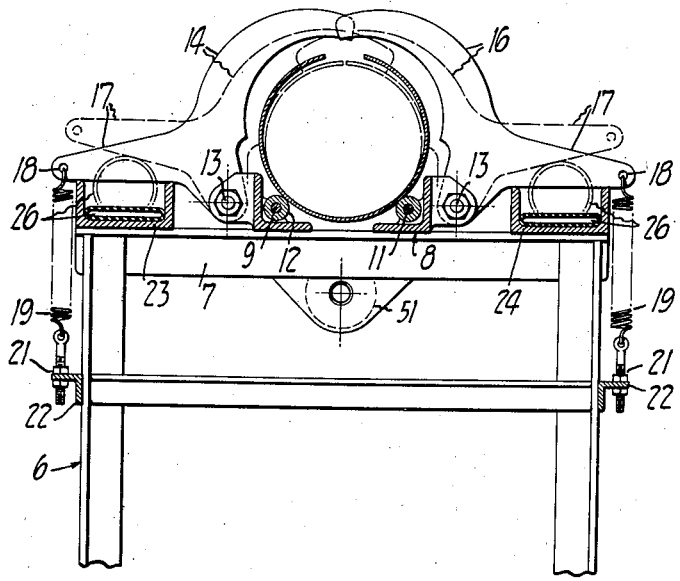
FIG_4_
INVENTOR.
Frederick W. Haversack
BY Marcus Lothrop
ATTORNEY.

Patented Mar. 18, 1941

2,235,553

UNITED STATES PATENT OFFICE 2,235,553

PIPE-FORMING MACHINE

Frederick W. Haversack, Sacramento, Calif., assignor of one-half to Sacramento Pipe Works, Sacramento, Calif., a corporation of California Application November 8, 1937, Serial No. 173,424

5 Claims. (Cl. 153—44)

My invention relates to means for facilitating the fabrication of cylindrical pipe from planar or flat sheet or plate stock, and is particularly concerned with means for assisting in the formation and welding of the sheet or plate.

An object of my invention is to provide an improved pipe-forming machine.

Another object of my invention is to provide a pipe-forming machine which conserves a great deal of time and labor.

A further object of my invention is to provide a pipe-forming machine in which successive pipe sections formed from similar sheets are of regular contour and dimensions.

Another object of my invention is to provide a pipe-forming machine useful in assembling pipe of great length.

Another object of my invention is to provide means for gripping a pipe firmly for operations thereupon.

The foregoing and other objects are attained in the embodiment of the invention illustrated in the drawings, in which—

Fig. 1 is a plan of a pipe-forming machine constructed in accordance with my invention;

Fig. 2 is an end elevation of the machine shown in Fig. 1;

Fig. 3 is a cross-section the plane of which is indicated by the line 3—3 of Fig. 1;

Fig. 4 is a cross-section the plane of which is indicated by the line 4—4 of Fig. 1.

In its preferred form, the pipe-forming machine of my invention includes means for supporting a partially formed pipe section, combined with means for forcing the section into its final shape and holding such section by means of hydraulic pressure while a welding operation is performed upon the pipe preferably by an electric welding head which may include a manually operable control for governing the welding movement of the pipe being formed.

In the usual fabrication of pipe sections from flat metal sheets or plates, it is customary gradually to form the sheet into an arcuate cross-sectional contour by repeatedly rolling the sheet in a pyramid roll and, when the edges of the sheet have substantially approached each other, to stop the rolling operation, tack-weld the approached edges, dismantle the pyramid roll partially, and remove the partially formed section for further welding. This procedure entails the services of a plurality of workmen, occupies the pyramid roll for a great length of time after the initial forming work has been done, simply to retain the pipe section while it is tack-welded and finally formed, and involves a relatively slow procedure.

In accordance with my invention, a pyramid roll is first utilized to form a flat sheet, of rectangular contour usually, into a substantially circular-cylindrical pipe section with the sheet edges approximately contacting each other. There is, however, a longitudinally extending gap between the edges. Sometimes, due to slight inaccuracies in the forming operation, or due to slight non-rectangularity of the sheet, the resulting cylinder has slightly helical ends, or, in other words, the approached edges of the sheet do not exactly register at the opposite ends of the cylinder.

The partially formed sheet, without any welding, is removed from the pyramid roll as soon as it has assumed a substantially cylindrical form, and the pyramid roll is utilized immediately thereafter for the initial formation of a successive section. In this way the output of the pyramid roll is increased materially, experience usually showing that the output of a pyramid roll can be at least tripled if it is given over simply to the formation of pipe sections without having any tack-welding or subsequent operations performed therein.

I provide mechanism for further forming, holding and manipulating a pipe section while it is being welded. This mechanism includes a framework 6, suitably fabricated of metal shapes, joined by cross-beams 7. On the cross-beams there is supported a bed structure 8, including journals for longitudinal shafts 9 and 11 each of which is enlarged to form rollers 12. Adjacent to the shafts 9 and 11 the bed 8 forms pivotal mountings 13 for a plurality of arcuate levers 14 and 16 arranged respectively along the two sides of the framework and located in staggered relationship to each other, as shown in Fig. 3. Each of the levers is provided with an extension 17 having an eyelet 18 therein to which a coil spring 19 is fastened. The springs are held by adjusting mechanisms 21 on angle irons 22 fastened to the frame 6, so that any desired spring tension can be exerted upon the levers 14 and 16 in order to urge them normally apart.

The movement of the levers in a separating direction is limited, however, by channels 23 and 24 arranged on opposite sides of the frame 6, each of which serves as a support for a hydraulic means for operating the levers 14 and 16 simultaneously. Preferably, this hydraulic mechanism takes the form of a pair of flexible bags 26, one being disposed in each of the channels 23 and 24. Each bag is closed at one end which is fastened in place by a clip 28, and at the other end is connected to a pipe manifold 29 mounted on the frame 6 and connected through a valve 31 to a supply pipe 32 and through a valve 33 to a discharge pipe 34.

The valves 31 and 33 are simultaneously and oppositely actuated by a link mechanism 36 controlled by an operating handle 37, so that when the inlet valve 31 is closed the outlet valve 33 is opened, and vice versa. Thus, when the inlet valve is opened and the outlet valve is closed, hydraulic pressure is exerted through the piping 29 within each of the hydraulic members 26 so that they are altered and expanded in cross-section, thereupon contacting the lower edges of the extensions 17 on the levers 14 and 16 and moving such levers about their pivotal points 13 to cause them to approach each other against the urgency of the springs 19. When the members 26 are fully expanded, the levers 14 and 16 occupy overlapped positions to define part of a substantially accurate circle the remaining periphery of which is defined by the rollers 12.

In the operation of the structure, the lever 37 is manipulated so that the inlet valve 31 is closed and the discharge valve 33 is open. Under the urgency of the springs 19 the flexible hydraulic containers 26 are collapsed and the levers 14 and 16 are spaced apart. A partially preformed, although perhaps somewhat irregular, pipe section of generally cylindrical contour is introduced into the machine to rest upon the rollers 12 and to underlie the various pairs of levers 14 and 16. Preferably, the pipe section is of substantially the same length as the framework 6 and is introduced so that its remote end is at the far end of the machine from the control lever 37.

Preferably, the longitudinal gap in the approached edges of the sheet is disposed uppermost in the machine, extending longitudinally thereof, and, in order to rectify any discrepancy in the longitudinal contour of the pipe section, and in order to align the adjacent corners of the sheet in a circumferential direction, I provide means for clamping the partially formed pipe section in a longitudinal direction.

For this reason I extend the framework 6 to provide at one end a superstructure 41 and at the other end a superstructure 42, each constituting substantially a hollow square. Journaled in the upper portion of each one of the superstructures 41 and 42 is a cross-shaft 43 carrying a centrally disposed depending plate 44 which is rotatable with the cross-shaft. An operating handle 46 is provided for rotation of the shaft 43, and a retractable pin 47, engageable with an apertured boss 48 on the framework, is available to hold the lever 46 in position or to free it for rotation.

When the partially formed pipe section is introduced into the machine with the longitudinal gap uppermost, it is forced longitudinally until its remote end abuts the remote plate 44. During this time the pin 47 is in engagement with its adjacent boss 48, so that the shaft 43 is non-rotatable and the plate 44 provides a firm abutment. Then the handle 46 on the superstructure 42 is rotated in a clockwise direction, as seen in Fig. 3, and, as it approaches its lowermost position, engages the perhaps misaligned ends of the sheet adjacent the gap and forces them into aligned position, so that when the pin 47 is introduced into the boss 48 the pipe section is longitudinally clamped between the plates 44 at opposite ends of the machine and held in aligned position for further operation.

Concurrently with the final clamping movement of the lever 46, or at some other appropriate time, the lever 37 is operated to position the valves 31 and 33 so that hydraulic fluid under pressure expands the members 26. The levers 14 and 16 are thus actuated to clamp the pipe section in a circumferential direction until such time as the adjacent edges of the pipe section are in substantially abutting relationship. At this time the pipe section is in an appropriate position for welding, and tack-welds are preferably made along the meeting edges of the pipe section. In order to save time and to advance the operation, I can then release the pins 47 and rotate the levers 46 to free the pipe so that it can be forced longitudinally toward the left, for example, in Fig. 3, and discharged from the machine for further welding or other operation at a distant point.

As an alternative procedure, after the pipe has been tack-welded and is still held in the machine, I can complete the longitudinal weld and can advance the pipe substantially half-way through the machine after releasing the end clamp plate 44, and can then likewise support another pipe section in a position substantially half-way into the machine in approximate abutment with the pipe section just moved, so that the ends of the successive pipe sections are substantially as indicated by the dotted lines 50 in Fig. 1. Although the clamp levers 14 and 16 are released, the weight of the pipe sections upon the rollers 12 is sufficient so that when an electric motor 51 connected to them is energized the rollers are rotated on their shafts 9 and 11 and the pipe sections are rotated in unison, so that an operator using an electric welding head 52, including a welding rod 53, can effectuate a circumferential weld between the two pipe sections.

Preferably, the electric circuit to the motor 51 is under the control of the operator utilizing the head 52, by means of an electric switch 54 thereon connected to the motor through a flexible conductor 56. In the event the rotation of the rollers 12 advances the pipe faster than is convenient, the operator, by opening the switch 54, can momentarily halt the rotary movement of the pipe portions. In place of the switch 54 a rheostat can be utilized so that the operator can vary the speed of rotation of the rollers by varying the speed of rotation of the motor 51; but ordinarily I have found it sufficient simply to provide means for opening and closing the motor circuit.

In this fashion, successive pipe sections, after having been formed and tacked, or completely welded longitudinally, can be joined onto other sections by circumferential welds so that a finished pipe of great length and comprised of a plurality of sections can be made. All of the longitudinal seams are straight and all of the circumferential seams are circular rather than slightly helical, and this device, when supplementing a pyramid roll for forming the pipe sections originally, affords a great advantage over former manners of fabrication.

I claim:

1. A pipe-forming machine comprising a frame, means on said frame for supporting a substantially circular-cylindrical pipe section, a plurality of pairs of offset separate levers pivoted on said frame to turn about a pair of axes on opposite sides of and parallel to the axis of said section, each of said separate levers having an arcuate portion of substantially the radius of said section and having sufficient length to overlap its opposite lever, and means for individually pressing each of said separate levers against said section with substantially uniform pressure.

2. A pipe-forming machine comprising a frame, means on said frame for supporting a pipe section, hydraulically expansible members on said frame, a series of arcuate levers pivotally mounted on one side of said frame and movable by one of said expansible members to constrict said pipe section and a second series of arcuate levers overlapping said first series and mounted on the other side of said frame and movable by the other of said expansible members to constrict said pipe section, and means for controlling the expansion of said expansible members.

3. A pipe-forming machine comprising a frame, means on said frame for supporting a pipe section, a series of arcuate levers pivotally mounted on said frame to turn into abutment with said pipe section about an axis on one side of said pipe section, an expansible tube interposed between said frame and said series of levers, a second series of arcuate levers pivotally mounted on said frame to turn into abutment with said pipe section about an axis on the other side of said pipe section, an expansible tube interposed between said frame and said second series of levers, and means for hydraulically expanding said tubes.

4. A pipe-forming machine comprising a frame, means on said frame for supporting a pipe section, a pair of channels on said frame on opposite sides of said supporting means, a pair of levers pivoted on said frame, each of said levers being disposed on one side of said supporting means to extend over the adjacent one of said channels and to overlap the other of said levers, and an expansible tube in each of said channels in abutment with the adjacent lever.

5. A pipe-forming machine comprising a frame, means on said frame for supporting a substantially circular-cylindrical pipe section solely by exterior engagement therewith, mutually approachable members on said frame and distinct from said supporting means for constricting said pipe section, and means on said frame for longitudinally confining said pipe section during constriction thereof.

FREDERICK W. HAVERSACK.